US008219115B1

(12) United States Patent
Nelissen

(10) Patent No.: US 8,219,115 B1
(45) Date of Patent: Jul. 10, 2012

(54) LOCATION BASED REMINDERS

(75) Inventor: Marco Nelissen, San Jose, CA (US)

(73) Assignee: Google Inc., Mountain View, CA (US)

( * ) Notice: Subject to any disclaimer, the term of this patent is extended or adjusted under 35 U.S.C. 154(b) by 442 days.

(21) Appl. No.: 12/464,650

(22) Filed: May 12, 2009

Related U.S. Application Data

(60) Provisional application No. 61/127,399, filed on May 12, 2008.

(51) Int. Cl.
*H04W 24/00* (2009.01)
(52) U.S. Cl. ............... 455/456.3; 455/414.1; 455/414.2; 455/418; 455/456.1; 455/457; 455/566
(58) Field of Classification Search ............... 455/414.1, 455/414.2, 418, 456.1, 456.3, 457, 566, 567; 707/769, 770, 771
See application file for complete search history.

(56) References Cited

U.S. PATENT DOCUMENTS

| | | | | |
|---|---|---|---|---|
| 6,519,463 | B2 * | 2/2003 | Tendler | 455/456.3 |
| 6,920,328 | B2 * | 7/2005 | Wollrab | 455/456.1 |
| 7,668,537 | B2 * | 2/2010 | De Vries | 455/414.1 |
| 7,818,317 | B1 * | 10/2010 | Emigh et al. | 707/724 |
| 2001/0018349 | A1 * | 8/2001 | Kinnunen et al. | 455/456 |
| 2002/0119788 | A1 * | 8/2002 | Parupudi et al. | 455/456 |
| 2003/0225589 | A1 * | 12/2003 | Eaton et al. | 705/1 |
| 2004/0203847 | A1 * | 10/2004 | Knauerhase et al. | 455/456.1 |
| 2007/0073810 | A1 * | 3/2007 | Adams et al. | 709/205 |
| 2008/0070546 | A1 * | 3/2008 | Lee | 455/404.2 |
| 2009/0036148 | A1 * | 2/2009 | Yach | 455/457 |
| 2009/0233629 | A1 * | 9/2009 | Jayanthi | 455/457 |

FOREIGN PATENT DOCUMENTS

WO   WO 2007040646 A1 * 4/2007

\* cited by examiner

*Primary Examiner* — Olumide T Ajibade Akonai
(74) *Attorney, Agent, or Firm* — Fish & Richardson P.C.

(57) ABSTRACT

A computer-implemented user alert method includes identifying a task for a user, associating a location with the task, monitoring a location of a mobile device associated with the user, and notifying the user about the task when the mobile device comes within a defined proximity of the associated location.

16 Claims, 5 Drawing Sheets

LOCATION BASED REMINDERS

CROSS REFERENCE TO RELATED APPLICATION

This application claims the benefit of U.S. Provisional Application Ser. No. 61/127,399, filed on May 12, 2008, the content of which are hereby incorporated by reference in its entirety.

TECHNICAL FIELD

This document relates to systems and techniques for identifying locations for carrying out tasks in a task list for a user of a mobile computing device.

BACKGROUND

As people use desktop computers and mobile device such as smart phones more and more, they rely on the devices more and more also. For example, a user may rely on a scheduling application to track his or her appointments and other activities during a future period. The scheduling application may permit users to enter appointments directly or by accepting meeting invitations or similar interface elements. Such appointments may then be stored so that the user may be notified when the appointments come up. Separately, a user may keep a task list of all the chores the user needs to complete, such as projects for work and errands for their home. As some example, the tasks may include completing certain documents or jobs, and also even picking up dinner on the way home from work. In certain circumstances, an application can treat scheduled events and tasks relatively interchangeably, as items relevant to a user's upcoming schedule.

SUMMARY

This document describes systems and techniques that may be used to provide a user of a mobile device with reminders about tasks on the user's task list, when the user is near a facility that can help them with the particular task. For example, a task may indicate the name of an acquaintance of the user, and the device may look to the user's contact list to find a location (e.g., home address) for the acquaintance. That location may then be registered with a location tracking system for the device, so that the user may be reminded, using an alert, when the user is close to the acquaintance's house. In a similar manner, the task may include a command with a description of a product such as "get milk" or "pick up dinner," and the product identifier (or a related identifier, such as "food" or "restaurant," respectively) may be used to identify one or more facilities near the user that may carry the product.

Such techniques may provide for one or more advantages under certain implementations. For example, a user may enter tasks (or may have tasks entered for them, such as by a spouse) in a simple manner, without needing to explicitly associate a location with the task. A system may then conveniently provide the user with reminders that are based on the user's location, with the location being checked automatically for the user, whether with or without an explicit user request. The user may then save time by performing tasks when they are in the right location, without having to go out of their way. In addition, the user may be alerted to facilities, such as grocery stores, that are proximate to them, but of which they were not previously aware. Users may thus be more satisfied with the experience and may use their task system more often. In addition, a provider of such as reminder service may accompany the service with advertisements, coupons, and other promotional materials relating to the user's needs and the user's location. For example, the system may show the user current prices for a particular product in the user's area, along with a coupon to obtain even better prices at certain stores. Vendors with superior prices or with paid promotions (e.g., where the vendor is advertising through a provider of the location information) may be emphasized to the user over other vendors. The particular vendor or advertiser may be charged for a display of an advertisement, or may be charged when the user is observed to stop at the advertiser's facility—under an assumption that a stopping consumer is also a shopping consumer.

The monitoring of a location of a mobile device may be identified to a user so that the user can turn off the feature if they are concerned with privacy at any particular time. For example, an icon may be shown to indicate to a user that such tracking is occurring. Also, a system may be programmed to keep most or all location information about the device on the device itself, and requests (e.g., for local search results) may be blurred sufficiently to hide the user's actual location.

In one implementation, a computer-implemented user alert method is disclosed. The method comprises identifying a task for a user, automatically associating a location with the task, monitoring a location of a mobile device associated with the user, and notifying the user about the task when the mobile device comes within a defined proximity of the associated location. Identifying a task for the user can comprise selecting a task from a user task list in a personal digital assistant application. Also, associating a location with the task can comprise comparing all or part of a task description for the task with the user's contact list. Alternatively, associating a location with the task can comprise submitting all or part of a task description for the task to a remote local search engine, or identifying a task type from a task description for the task, and identifying one or more facilities corresponding to the task type.

In some aspects, monitoring the location of the mobile device comprises registering an area around the location with a location tracking application that monitors locations for a plurality of different applications. In addition, notifying the user can comprise generating a display of a map around the user's current location and the determined location, and providing a visual or audio indication of the task content. The method may also comprise comprising maintaining a repeating task and reminding the user about the task after an expiration of a determined time since a prior completion of the task.

In another implementation, a computer-implemented notification system is disclosed. The system comprises an alert interface to provide a user of a mobile device with information concerning one or more facilities in proximity to the user, a task list database storing tasks for the user, including tasks, and an alert module programmed to provide information to a user about the one or more facilities upon determining that the one or more facilities are responsive to tasks in the task list database. The alert interface can comprise a mapping module to present a representation of an area surrounding the user and one or more facilities corresponding to an active task in the task list database. Also, the alert module can be programmed to parse descriptive terms from the task data and identify one or more facility types from the descriptive terms in order to identify the one or more facilities. The descriptive terms can comprise product or service descriptions, and the facility types comprise vendors that vend the products or services.

In certain aspects, the alert module is programmed to parse location-related terms from the task data and provide the terms to a location analyzer to obtain geographic coordinates for the location-related terms. The system can also include a location manager to receive area identifiers from a plurality of location-aware applications and provide alerts to the location-aware applications when the mobile device enters an area associated with one of the area identifiers. In addition, the system can comprise a task scheduler to maintain repeating tasks that expire upon a user selection and re-appear automatically after a determined time period.

In yet another implementation, a computer-implemented notification system is disclosed that comprises a graphical user interface to provide a user of a mobile device with information concerning one or more facilities in proximity to the user, a task list database storing tasks for the user, including tasks associated with geographic locations, and means for identifying to a user one or more locations capable of serving tasks in the task list.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for providing a user of a computing device, such as a mobile smart phone or vehicle navigation system, with information regarding tasks that the user is to perform, where the trigger for providing such information is the user's current location (i.e., as determined via the location of the user's mobile device). In particular, locations may be associated with certain tasks in a task list for a user, such as by analyzing the task list for name information and looking for the name in an on-line database or a contact list for the user, for address information and converting the address information to a standard geographic identifier (e.g., a lat/long identifier), or by identifying a name for a product or service and finding various facilities that provide the product or service.

Such a system may then identify areas around such geographic locations, so that, when the user passes through those areas, the mobile device may remind the user to complete a particular task. The size of the areas around certain facilities may be chosen in proportion to the importance of the task, where a user would not be expected to travel far out of their way to pick up milk, but might travel much farther to obtain a favorite snack or a pick up an important or expensive item at a store.

Figure 1:
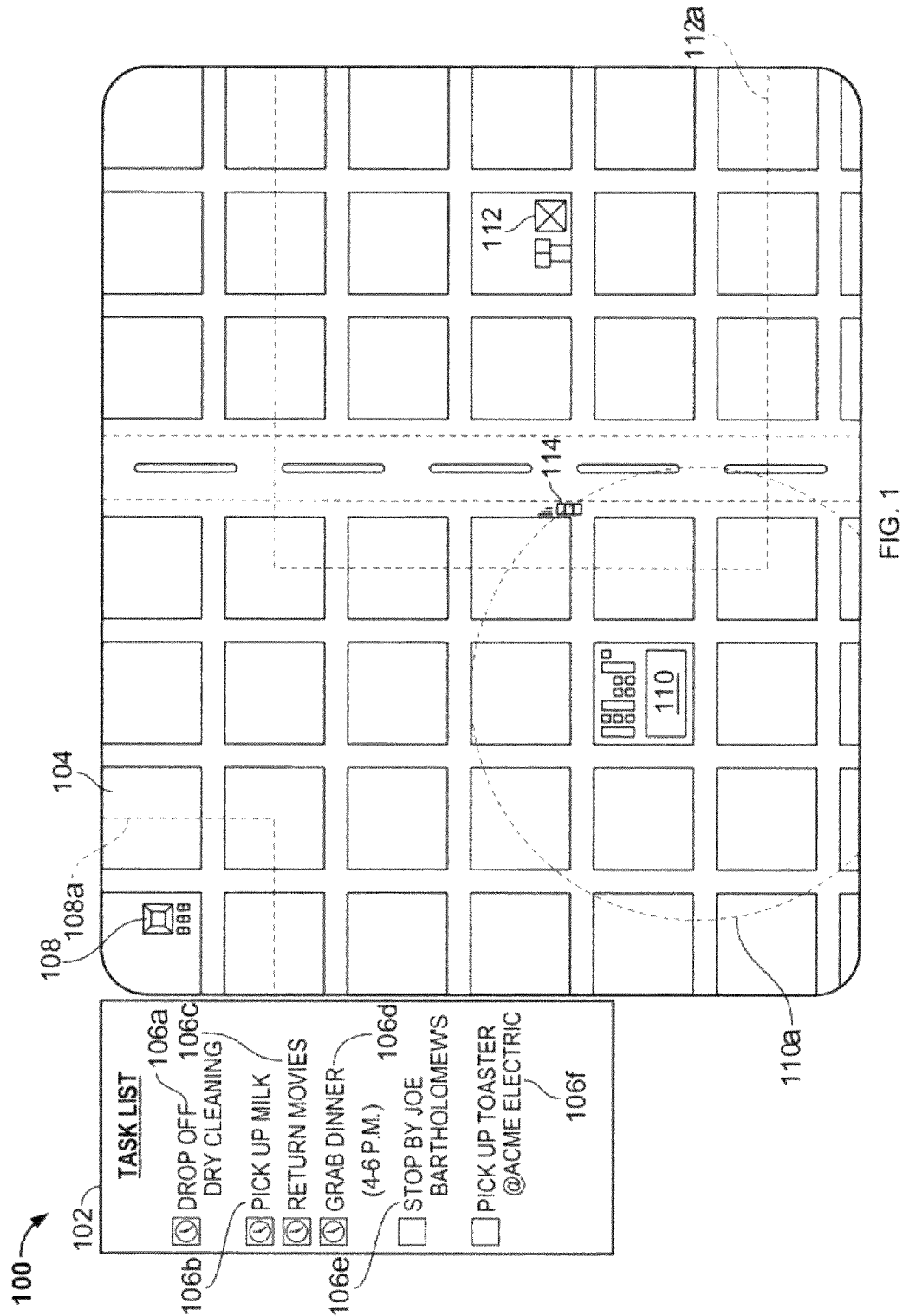
FIG. 1 is a conceptual diagram of a system for providing location-based reminders to a user.

FIG. 1 is a conceptual diagram of a system 100 for providing location-based reminders to a user. The system 100 is shown conceptually in this figure using a map 104 of a downtown area, and a task list 102 associated with a user traveling in car 114 in the area of the map 104. Certain elements from the map 104, in particular implementations, could be displayed on a graphical user interface (GUI) of a user's mobile device, to present various of the concepts discussed here.

The task list 102 may be a list associated with a user application such as a personal digital assistant application, in a form like that provided by MICROSOFT OUTLOOK. In this example, the task list 102 has been populated with a variety of personal tasks for a user, to demonstrate certain examples for which location-based reminders may be provided to the user. Certain of the tasks in the task list 102 are associated with locations on the map 104, as next described. The tasks are actions that the user or someone associated with the user have identified as something the user needs to complete, but without particular time frames (though they may have a triggering date, such as a date certain (e.g., May 1, 2012), or a relative date (e.g., every Monday morning)), whereas appointments are actions that the user needs to attend to at a particular time period.

Task 106a is a task for the user to drop off dry-cleaning at a local laundromat. In this example, a box next to task 106a has been left unchecked, indicating that the task is inactive (e.g., there is currently no need to pick up laundry). In certain situations, a task may occur a single time and may be cleared from the system 100 once a user has indicated that they have completed the task. In other situations, the task may be a repeating task, such as in the situation shown here for dropping off dry-cleaning, where a user would be expected to drop off dry-cleaning multiple times over the course of a year, perhaps on a periodic (e.g., weekly) basis. Other similar repeated tasks may involve picking up food or other staples to bring to the user's house, where the staples are regularly consumed by the user and his or her family, and thus need to be replenished periodically. Repeated tasks do not generally disappear from a system after a user shows them as having been completed—though they may be made inactive until a new task period begins (e.g., by disappearing until the next Monday and then reappearing, for a weekly task).

Task 106b relates to a need by the user to pick up milk. This task is indicated as checked, using a clock icon, to indicate that the task is currently active. Task 106b, for example, may be presented to a user and cleared by the user after they have picked up milk. System 100 may be programmed to keep such a task inactive for a determined period of time, such as several days, where the period of time relates to the expected time for the user to consume the good that is represented by the task—here, the consumption of milk by the user and their family. A user may also be given the option to temporarily clear a task if it appears automatically, such as where the user and their family have been consuming very little of a product during a time period and would like to have the reminder removed for a period shorter than a full task cycle. For example, a typical cycle for obtaining milk for a family may be four days, and when a user sees the reminder at four days, the user may choose to have the reminder pushed off for another two days if the family has sufficient stocks of milk at the time.

Task 106c relates to a need to return movies that the user has rented from a nearby movie rental service. The task 106c, like the other tasks here, may be set by the user, by an acquaintance of the user, such as the user's spouse, or by a third party. Here, the third party may be a company that manages the movie rental business, and may automatically send a task reminder to the user employing contact information in the user's account profile, in addition to the user's e-mail address. In this manner, a user may receive task reminders more conveniently from trusted third parties (where the reminders can be automatically added to the user's task list for third parties that the user has indicated as being particularly trusted, and added in responses to an affirmative user confirmation (e.g., selecting an "add to task list" button) by the user for less trusted third parties, and may be spared the chore of entering detailed information for such reminders.

The movie rental store is indicated on map 104 at facility 108. The location of the movie rental store may be determined by the system 100 in a variety of ways. For example, when the task 106c is provided by the movie rental store itself, the stored may include address information with the task request. The system 100 may parse the task description to identify such address information in a familiar manner, and may submit such address information to determine a readily understandable geographic location identifier for the location. For example, the system 100 may submit the address information to a remote server to obtain latitude and longitude coordinates for the facility 108, so that a location like that shown on map 104 may be generated by a mobile device 102 for the user.

An area 108a is shown around facility 108, to indicate a zone in which the user will be notified if they pass while a task associated with the facility 108 is active. The area 108a may take a variety of forms, such as a circle, square, or other closed polygon around the facility 108, and its distance from the facility 108 may be determined in a variety of manners. For example, a facility type (e.g., movie rental store, or light retail) may be assigned to the facility 108, and a certain area may be assigned to all facilities of a particular type. As one example, facilities that normally sell low-priced items may be provided with a smaller area than facilities selling high-priced items, under the assumption that a user will be more likely to travel a longer distance upon being reminded that they need to purchase a high-priced item than they would for a low-priced item. Alternatively, the area assigned to a facility may depend on the number of facilities in a particular geography. For example, where there are a number of grocery or convenience stores in an area, the alerting area assigned to each store may be relatively small, so that a user is not being reminded frequently of the presence of such stores. In one such example, the area around a convenience store may be approximately one block long and one block wide, or may be circular with a one block radius.

Task 106d is active and instructs the user to grab dinner on her way home. This particular task 106d has been assigned a time period in which it will be active each day. Here, the time period is 4 p.m. to 6 p.m., recognizing that a user will typically be driving home during this two-hour period, and will also need to obtain dinner on the way home on many days. The task may have been assigned by the user's spouse, such as by the spouse sending a task request to an e-mail address for the user.

The task 106d is not associated expressly with a particular facility or location, but the term "dinner" may be extracted or parsed out of a task description by the system 100, and may be applied as a search term to a local search engine. For example, the term "dinner" may be associated with terms such as "restaurant," and a search may be conducted for restaurants in a user's vicinity. Such restaurants may be highlighted on a map that is shown on the user's mobile device 202 as the user drives from work to their home. The user's device or a server remote from the device may identify "restaurant" as a preferred substitution for "dinner" in the query, and may submit only the substituted term, or the original term plus the substituted term as part of the query, which may be directed as a "local" search aimed at returning search results that correspond to a geographic area around the user's device.

Task 106e shows a task for the user to stop by an acquaintance's house 112. Such a task may not contain an explicit reference to a location. However, the system 100 may parse the task description and determine that "Joe Bartholomew" (which may occur in the task description) is a name of a person, and may apply that name to a contact list associated with the user (e.g., a contact list stored on the user's device). Such a contact list may include the name of the acquaintance, the acquaintance's telephone number, and the acquaintance's address. The address may then be supplied to a local search engine to obtain a geographic identifier (e.g., an identifier that represents a latitude and longitude), and an area 112a around the acquaintance's house 112 may be designated as a zone in which a reminder will be generated if the user enters the zone. In this situation, the zone 112a may be larger than zones for various retail outlets, under the assumption that there is only one single location for the friend, and the user will be willing to drive out of his or her way to visit the friend.

Task 106f is treated in a manner similar to task 106e. In particular, task 106f includes a term describing a particular business—here, ACME Electric. The task description may be parsed by system 100 to identify the business name, which initially may be searched in a user's contact list. If the business name is not found in the contact list, the system 100 may submit the name to a "local" search system that is remote from the device to obtain address information, and subsequently geographic location information, for the business. The local search may also identify the business as being of a particular type—here, a hardware store or similar store. That business type may be used to generate an area around the facility, here, facility 110 encircled by area 110a in the form of a radius—such as determining that a user is willing to go a certain distance out of their way to visit a hardware store. If multiple stores having the name are found (e.g., if the store is part of a chain), the store closest to the user may be identified or all stores in the user's general vicinity may be identified.

in operation, then, the system 100 may initially be provided with a number of tasks for a user. Those tasks may be analyzed to identify location-related information associated with the tasks, in manners like those discussed above. The location-related information may then be used to construct alert zones around facilities associated with the tasks, and the location of the mobile device for the user may be tracked so as to generate an alert when the user passes into one of the zones.

In this example, the user is in automobile 114 driving South on a main thoroughfare in the mapped area 104. The user is inside area 112a around the user's friend's house 112. The user's mobile device should have already provided an alert, such as in the form of a beep and an on-screen graphical user interface display, indicating that the user is within a proximity of the friend's house 112. For example, a map like map 104 may be displayed, showing the location of the user's car 114 and the friend's house 112, perhaps with a suggested route joining the two so that the user may readily be guided to the friend's house 112 using a turn-by-turn navigation application. For example, if the user turns onto the provided route, the system 100 may infer that the user intends to visit the friend's house 112, and may began providing turn-by-turn directions to the user.

The car 114 is also just entering the area 110a around the ACME Electric store 110. As a result, the user may also be provided with a notification regarding a need to pick up their toaster that is being repaired at the ACME Electric store 110. The user may clear either of the alerts and tasks in a variety of acceptable manners. For example, the user may position a cursor over an alert and click on the alert to dismiss the alert, and in certain circumstances, to dismiss the task also. Other appropriate techniques to dismiss a task may also be employed (e.g., if the user is observed to go to the location for the alert and stay a particular time period).

The display of facilities associated with tasks may also be accompanied by promotional materials, such as advertisements and coupons. For example, where the task 106d indicates that the user is to grab dinner, a system may provide a display to the user showing icons for various take-out restaurants along their route home, where certain of the restaurants may have paid to have detailed information (e.g., advertisements) provided to users. Certain restaurants may be highlighted if they've purchased advertising with the system 100, and additional information for those restaurants may be displayed, such as coupons or special deals that are currently ongoing at the restaurants (where the coupons may include alphanumeric codes that the user may speak to a staff member at the restaurant when they arrive there, or may show to the staff member if the map is on a mobile device that the user can bring into the restaurant). In addition, a user may select one or more restaurants by navigating with a cursor or other device through the map, to obtain extra information about the restaurant, such as menu information, and to complete a click-to-call calling of the restaurant. For example, as a user enters an area around a restaurant, they may click to call the restaurant and place their order, so that the food is ready to be picked up by the time they reach the facility.

In this manner, the system 100 may conveniently provide real-time updates for a user as the user is driving through an area, like the area shown in map 104. The updates may be linked to tasks that have been assigned to the user by themselves or by others. The user may thus be relieved of the need to remember a variety of tasks that they need to perform, and may be more likely to complete various chores that have been assigned to them. In addition, the user may be less likely to run out of staples that have recurring appointments or tasks, and can also conveniently dismiss tasks that are not appropriate at the current time or in the current location. In addition, such task information may be joined with other information for the user, such as information about businesses around the user that are not tied to particular tasks, or businesses that are otherwise advertising around the user's current location.

Figure 2:
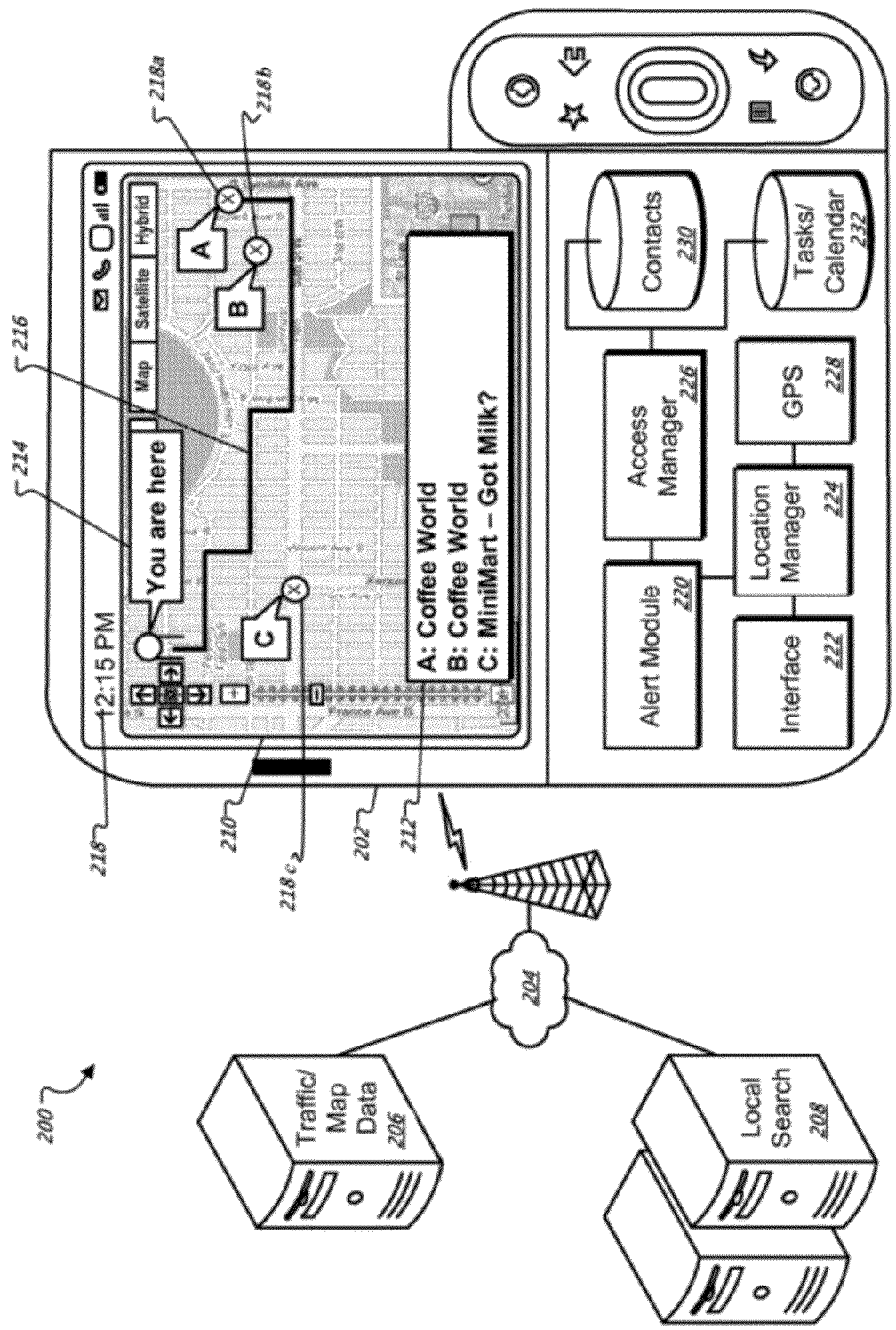
FIG. 2 is a block diagram of an illustrative location-based reminder system.

FIG. 2 is a block diagram of an illustrative location-based reminder system 200. In general, the system 200 is shown as involving a mobile device 202 communicating through a network 204, such as the Internet, with two example data sources 206, 208. The system 200 is configured in this example to provide a user with location-based reminders for tasks or appointments assigned to the particular user.

An example display 210 on device 202 provides a manner in which a user may be reminded of tasks associated with facilities in their area. In this example, a time indicator 218 shows that it is currently 12:15 p.m. The display 210 shows a map around the user's current location, and a location for a convenience store and two coffee shops around the user. Caption 214 indicates to the user their current location, while caption 218a shows the user the location of a first coffee shop, caption 218b shows the location of a second coffee shop, and caption 218c shows the location of a convenience store. The location of the user may be determined using GPS or other similar mechanisms (e.g., IP address or cell tower triangulation), while the location of the facilities may have been determined by identifying a name in a task description of address information in a task description, among other things.

A computed route 216 is shown between the user's current location and the location of the facility 218a. That route may be obtained from an online mapping service by providing the service with the user's current location and the location of the facility 218a, in a well-known manner. The route may be chosen for facility 218a based on a determination that the task associated with that facility is more important than the tasks associated with the other two facilities. Alternatively, suggested paths may be provided to all facilities that are within the current view of the interface 210.

An alert box 212 indicates to the user why they are being shown the information on display 210. In particular, the user is being told that they are near their favorite coffee shop (a task that the user always wants to have displayed to them) and are near a facility where they should be able to purchase milk (a recurring task that recently became active for the user).

Information for obtaining a location of the facilities may be obtained by the device 202 through network 204, from local search system 208. The local search system 208 may be one of a variety of commercial search systems that provide local search results, such as GOOGLE LOCAL SEARCH. The device 202 may communicate requests to local search system 208 using a standard API published by the operator of local search system 208.

In a similar manner, traffic/map data system 206 may provide information needed to generate maps, such as graphical tiles for maps and other familiar mapping components and data. In addition, the system 206 may provide information about real-time or near real-time traffic speeds in an area, so that a determination may be made by device 202 regarding the expected time to traverse a particular route.

Various component's on device 202 may enable device 202 to provide task alerts like those shown on display 210. For example, a contacts database 230 may include information about contacts associated with a user of device 202, in a familiar manner. The contacts database 230 may include names for the contacts, telephone numbers for the contacts, and address information for the contact. Thus, for example, when a user includes information about an acquaintance in a task (e.g., a friend's name), that information may be parsed from the entry and may be used to search the contacts database 230 to obtain a location for the acquaintance, or contact information for the acquaintance. The location information may in turn be used to identify a place for a task, and to then provide an alert to a user when they pass near to the place while the task is still active. Contact information, such as telephone numbers or e-mail addresses, may be used to permit a user of device 202 to readily contact such other users if there is a problem with the first user's schedule. In particular, the additional information may be displayed when a user selects a facility such as facility 218c on display 210.

Tasks and calendar database 232 may include appointment information, tasks lists, and other similar information for a user of device 202. The calendar information may for example, include information about start and end times of appointments in addition to descriptions of the appointments, and contact information for other people expected to be at the appointments. The task lists may include descriptions of tasks or chores that the user needs to complete in the future, and may take a form like that used with the MICROSOFT OUTLOOK software application.

Data in the tasks and calendar database 232 may be accessed to determine identifying information for users associated with an appointment or task, beginning and ending times for various appointments or active periods for tasks, and other information about the appointments or tasks.

Alert module 220 may manage the various activities necessary to track a user's tasks, and to provide a user with alerts regarding those tasks. For example, the alert module may be programmed to provide information to a user about one or more facilities associated with a task of a topic in a task upon determining that the one or more facilities are responsive to tasks in the task list database. The alert module may, for example, associate tasks with the facilities and may cause information such as that shown on display 210 to be generated with a user is determined to have passed near a facility associated with an active task.

An access manager 226, may control access by various applications to shared resources such as the contacts database 230 and the tasks and calendars database 232. For example, various applications may register themselves with access manager 226 and may make requests from access manager 226 using a standard API. The access manager 226 may manage security and other mechanisms relating to access of those resources. In one example, alert module 220 may periodically request information about tasks stored in tasks and calendar database 232. The alert module 220 may then perform actions like those described above to determine the form of alert to be shown to a user so that the user may understand what sorts of tasks they can perform as they move along their standard route. The alert module 220 may also rely on other modules, such as a mapping module (not shown) to generate other information associated with an alert, such as a map and suggested route to task-related facility. Such alerts and associated information are shown in display 210.

A location manager 224 may be an operating system component that tracks location-related events for various applications running on device 202. In particular, applications may register themselves with location manager 224 and may identify geographic areas for which they wish to be notified. If the user enters such registered areas, then the location manager 224 may provide an indicator of such an event to the appropriate registered application. In this manner, the location manager can serve as a central clearinghouse of location information, and can relieve various application from periodically checking the location of the device 202.

The location manager 224 may operate using a standard GPS module 228 on device 202, and may periodically determine the device 202 location from such interrogation. The location manager 224 may then compare the location provided by the GPS module 228 to various registered location or areas in order to determine whether an alert needs to be provided to one or more applications.

The location manager 224 and other components may also communication with systems outside device 202 using interface 222. The interface 222 may communicate with or incorporate a one or more standard wireless interfaces, such as to let applications on device 202 communicate with services such as those provided by servers 206, 208.

Figure 3:
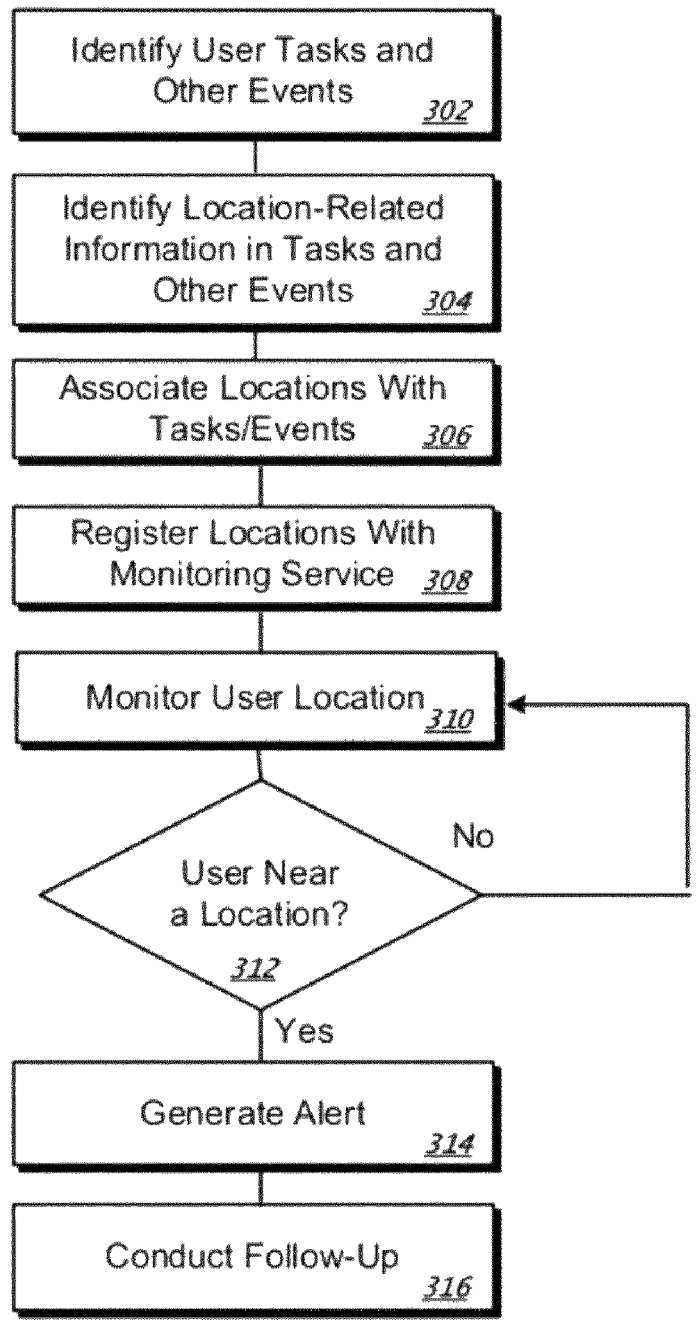
FIG. 3 is a flow chart of an example process for providing a user of a computing device with location-based reminders.

FIG. 3 is a flow chart of an example process for providing a user of a computing device with location-based reminders. In general, the process involves identifying location-related information in user tasks and similar user-related entries, and assigning monitoring zones related to those tasks and other entries. A user's mobile device may then keep track of those zones as it moves around, and may alert the user if it enters one of the zones. The form of the alert may depend on the type of task or other entry, and the content of a task description or other similar information. In this manner, the process may provide a user with a simple technique to receive location-based reminders from their mobile device.

The process starts at box 302, where tasks and other events for a user are identified. Such an identification process may simply involve checking a task list associated with a PIM application for a user's mobile device or other computing device. At box 304, location-related information in the tasks and other events is identified. Such identification may involve parsing task descriptions and other descriptive information to identify information that could possibly be associated with a location, whether directly or indirectly. For example, terms on a whitelist, such as "street," "avenue," _____ town," and "city," may be indicative of an address, and the full address may be extracted from the information. Alternatively, names of people or businesses may be extracted, and may be submitted to a contacts database, either on the user's device or at a remote server, to find location-based information associated with the person or business. Where such location-related information cannot be located, other information, such as verb-noun pairs in the information, may be extracted. For example, verbs such as "get" or "pick up" may identify a task that requires going to a particular location. Likewise, certain nouns, such as "clothing," "dry cleaning," "bread," "milk," and "dinner" may be associated with particular goods or services that can be obtained at one or more locations. Such noun terms may be modified and may then be supplied to a local search engine to identify facilities in a user's location that can provide the goods or services identified by the nouns.

At box 306, particular locations are associated with the tasks or other user events. For example, after a facility and/or address has been identified using techniques such as those just described, address information may be submitted to a central serve to obtain lat/long indicators for the location, or other similar geographic indicators that can be readily used by a computer system to place a facility within a geography.

At box 308, the determined locations may be registered with a monitoring service. Such a service may be a service made available by an operating system on a user device or by another application on the device, and may monitor movement of the device (e.g., using GPS functionality) to determine whether and when the device moves within a sufficiently short distance of one of the locations. If the user does not near any of the locations (box 312), the process continues to monitor the location of the mobile device.

Such location monitoring may be limited so as to guard the user's privacy. For example, the location-related information that is monitored may be kept on the user's device, or may be blurred sufficiently before it is provided to a central service so that the precise location of the user cannot be determined by anyone but the user. Also, where additional information is to be provided outside the user's device, the user may, in appropriate circumstances, be alerted and may be given the opportunity to opt in or opt out of such information sharing.

If the user's device strays within the proximity of a location that was previously identified, an alert may be generated for the user. The alert may simply involve a map being generated on a graphical user interface on the device, with the user's current location, the location of the relevant task or other information, and a description of the task being displayed.

The user may interact with such a display, so that follow-up is conducted by the process (box 316). For example, the user may choose to clear the task, and the process may remove the task from display on the device, either permanently (e.g., if it is a one-time task) or temporarily (e.g., if it is a recurring task). Also, the follow-up may involve registering the user's response to the task, such as the user's visiting of a facility relating to the task (as determined by GPS functionality of the device) and registering an advertising event relating to the user. For example, a vendor associated with the task may be charge an advertising rate, similar to a CPC or ad conversion charge.

Figure 4:
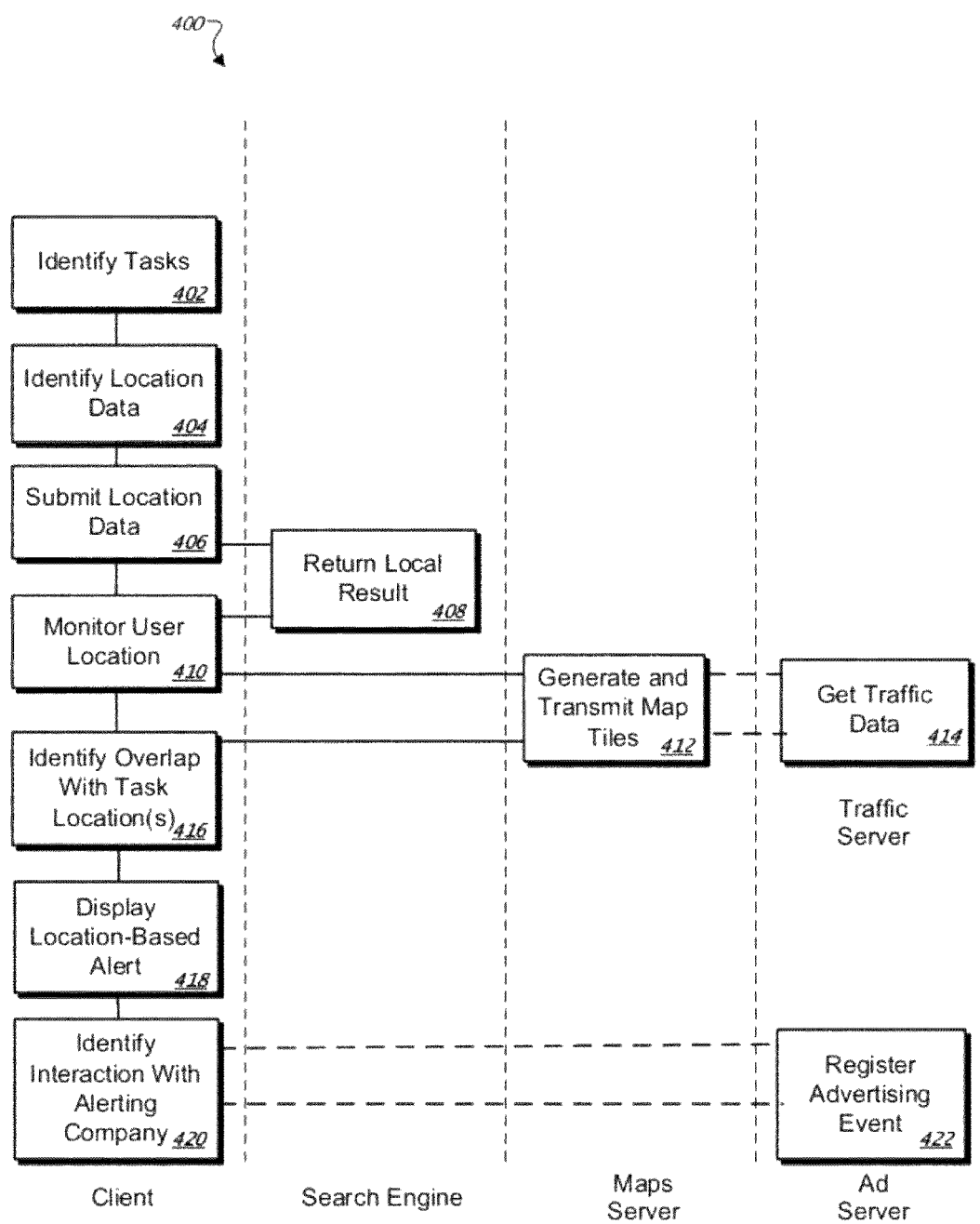
FIG. 4 is a swim lane diagram showing actions that may be taken to provide a user with location-based reminders.

FIG. 4 is a swim lane diagram showing actions 400 that may be taken to provide a user with location-based reminders. The actions are shown as being performed by multiple example servers to provide a clearer explanation of example communications that may occur in a system, but various actions may be combined into a single server (including a system of multiple servers) or other, additional servers not shown here may be involved.

The process starts at box 402, where a client device identifies tasks for a user of the device. The tasks may be identified, as discussed above, form a task list in a PIM application or in other appropriate manners. Other events associated with a user of the client device may also be identified at this stage of the process. Location data (box 404) may then be identified for the tasks or other events. As discussed above, the location data may be expressed in a task description (e.g., as an explicit street address) or may be implicit, such as in a name of a person or business, or even in a product name in the description.

At box 406, the client device submits the location-related data that it has extracted, to a search engine, such as a local search engine. The local search engine may receive the data according to a published API, and may provide a geographic identifier for each task or other event in response. The geographic identifier may include, for example, a standard lat/long location identifier. Upon receiving the various location identifiers, the client device may then monitor its own movements (box 410) to determine whether the user has passed within an alerting zone around one of the locations (and also to determine whether a particular task or event is active during a certain time). While the device and user are moving, the location of the user may be updated on a map shown to the user, with map tiles and other mapping information sent by a mapping server (box 412), including optional real-time traffic data from a traffic server (box 414). The traffic data may be overlaid on the map tiles in a famililar manner, such as by showing green, yellow, and red lines in to roads to represent approximate traffic speeds.

While the location monitoring is occurring, the client device may determine that it has passed within a zone surrounding a location for a particular task (box 416). When such overlap occurs, the client device may generate an alert (box 418) for the user, such as by showing a pop-up box on a graphical display on the device. The pop-up box may described the nature of the task or other event, and may be associated with an icon, pin, or other similar indicator at the location of the task. The alert graphic may be persistent, may blink, or may be shown for a time period and then be removed if the user does not indicate a response to it. The graphic may also be faded, such as by showing it only in outline, or in a partially transparent manner.

The user may interact with the alert in various manners. For example, the user may select the alert to receive additional information about the task, and potentially additional information about a vendor corresponding to a task. In one example, the task may involve picking up take-out food, as described above, and the additional information may include a telephone number for a nearby restaurant that matches the user's stored profile regarding preferred dining styles (e.g., That). The user may easily select a displayed telephone number of the restaurant to order ahead. In addition, the user may follow-up by otherwise interacting with the alerting company (box 420), such as by visiting the facility of the company. The process may register such as activity, as determined by the location-monitoring functionality of the client device.

In addition, certain interaction with alerting companies may be considered to be a billable advertising event. For example, if a user actually goes to a facility, the owner of the facility can fairly assume that the user did so because of the reminder. An advertising carrier may thus bill the advertiser for such actions by the user (where the advertiser has entered into an agreement with the carrier to that effect). Other similar actions by the user may result in compensation of an advertising carrying network, by an advertiser.

Figure 5:
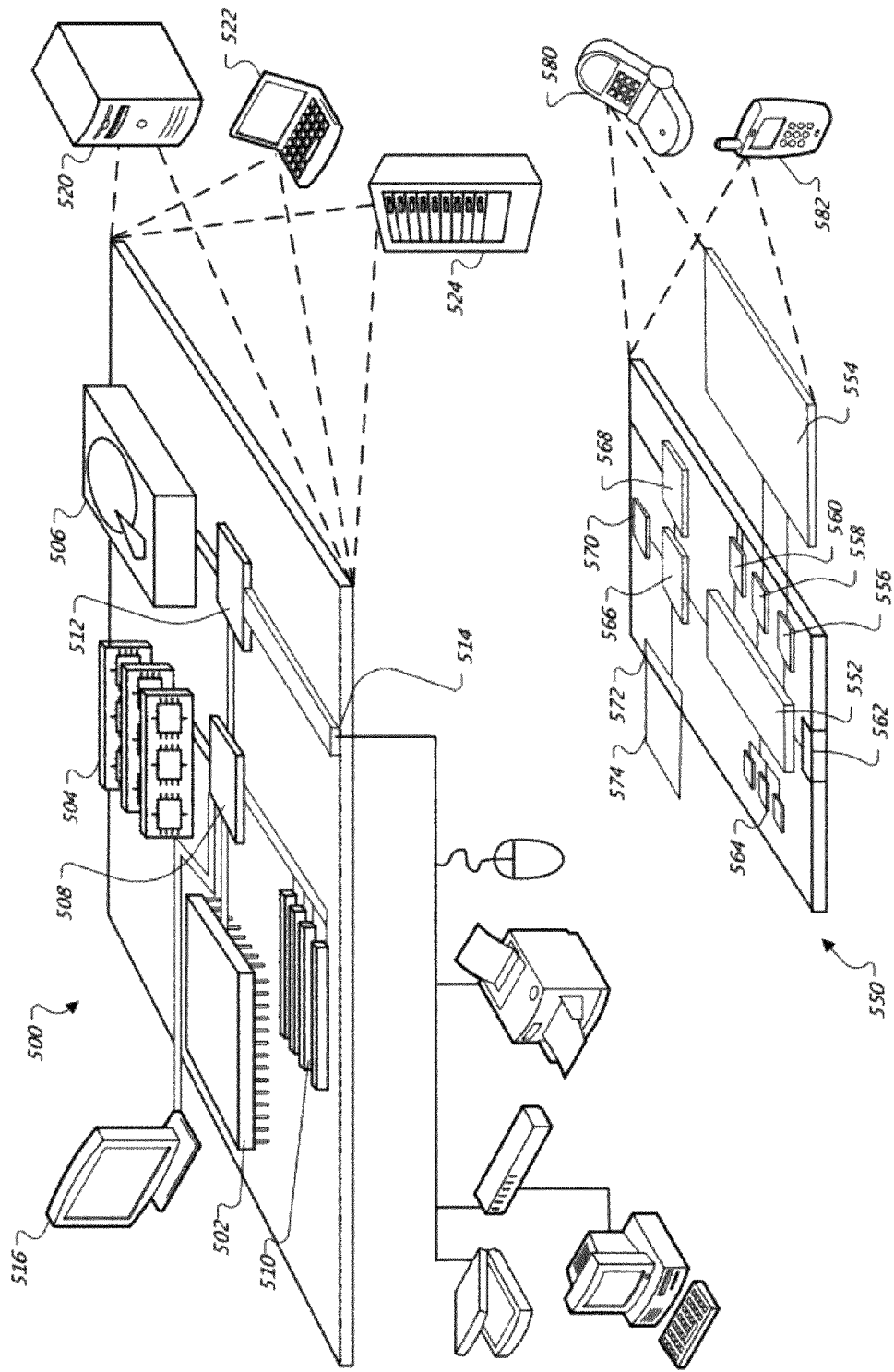
FIG. 5 shows an example of a computer device and a mobile computer device that can be used to implement the techniques described here.

FIG. 5 shows an example of a general computer device 500 and a general mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to tasks in a user task list, but other forms of user events may also be addressed.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
   identifying, by a mobile computing device, a task for a user of the mobile computing device;
   sending, to a server, location-related terms parsed from text associated with the task;
   receiving, from the server, geographic coordinates associated with one or more of the location-related terms;
   associating, by the mobile computing device, the geographic coordinates with the task; and
   outputting, by the mobile computing device, a notification based on the task when the mobile computing device determines that a current location of the mobile computing device is within a defined proximity of the geographic coordinates.

2. The computer-implemented method of claim 1, wherein identifying a task comprises receiving a user selection of the task from a list of one or more tasks.

3. The computer-implemented method of claim 1, wherein outputting a notification based on the task comprises generating, at the mobile computing device, a map of an area proximate to the geographic coordinates and providing, by the mobile computing device, a visual or audio indication of the task.

4. The computer-implemented method of claim 1, further comprising:
   maintaining a record of a repeating task based on the task; and
   outputting, after an expiration of a determined time since a prior completion of the repeating task, a reminder based on the repeating task.

5. A system comprising: one or more computers and one or more storage devices storing instructions that are operable, when executed by the one or more computers, to cause the one or more computers to perform operations comprising: identifying, by a mobile device, a task for a user of the mobile device; sending, to a server, location-related terms parsed from text associated with the task; receiving, from the server, geographic coordinates associated with one or more of the location-related terms; associating the geographic coordinates with the task; and outputting a notification based on the task when a current location of the mobile device is within a defined proximity of the geographic coordinates.

6. The system of claim 5, wherein identifying a task comprises receiving a user selection of the task from a list of one or more tasks.

7. The system of claim 5, wherein outputting a notification based on the task comprises generating a map of an area proximate to the geographic coordinates and providing a visual or audio indication of the task.

8. The system of claim 5, further comprising:
   maintaining a record of a repeating task based on the task; and
   outputting, after an expiration of a determined time since a prior completion of the repeating task, a reminder based on the repeating task.

9. A non-transitory computer-readable medium storing software comprising instructions executable by one or more computers which, upon such execution, cause the one or more computers to perform operations comprising: identifying, by a mobile computing device, a task for the user of a mobile computing device; sending, to a server, location-related terms parsed from text associated with the task; receiving, from the server, geographic coordinates associated with one or more of the location-related terms; associating the geographic coordinates with the task; and outputting a notification based on the task when a current location of the mobile computing device is within a defined proximity of the geographic coordinates.

10. The medium of claim 9, wherein identifying a task comprises receiving a user selection of the task from a list of one or more tasks.

11. The medium of claim 9, wherein outputting a notification based on the task comprises generating a map of an area proximate to the geographic coordinates and providing a visual or audio indication of the task.

12. The medium of claim 9, further comprising:
   maintaining a record of a repeating task based on the task; and
   outputting, after an expiration of a determined time since a prior completion of the repeating task, a reminder based on the repeating task.

13. A computer-implemented method, comprising:
   identifying, by a mobile computing device, a task for a user of the mobile computing device;
   parsing, by the mobile computing device, location-related terms from the task and providing the location-related terms over a network to a location analyzer to obtain geographic coordinates for the location-related terms from over the network;

associating, by the mobile computing device, the geographic coordinates with the task;

monitoring, by the mobile computing device, a location of the mobile computing device; and notifying, by the mobile computing device, the user about the task when the mobile computing device comes within a defined proximity of the associated geographic coordinates.

14. The method of claim 13, wherein identifying a task comprises selecting the task from a list of one or more tasks.

15. The method of claim 13, wherein notifying the user comprises generating, on the mobile computing device, a map around the associated geographic coordinates and providing, by the mobile computing device, a visual or audio indication of the identified task.

16. The method of claim 13, further comprising maintaining a repeating task and reminding the user about the task after an expiration of a determined time since a prior completion of the repeating task.

* * * * *